US012720091B2

(12) United States Patent
Sau et al.

(10) Patent No.: US 12,720,091 B2
(45) Date of Patent: Aug. 25, 2026

(54) HYBRID VIDEO ENCODING SYSTEMS

(71) Applicant: ATI Technologies ULC, Markham (CA)

(72) Inventors: Crystal Yeong-Pian Sau, Toronto (CA); Wei Gao, Aurora (CA); Baochun Li, Toronto (CA); Jiali Zhao, Toronto (CA)

(73) Assignee: ATI Technologies ULC, Markham (CA)

( * ) Notice: Subject to any disclaimer, the term of this patent is extended or adjusted under 35 U.S.C. 154(b) by 0 days.

(21) Appl. No.: 18/621,757

(22) Filed: Mar. 29, 2024

(65) Prior Publication Data

US 2025/0310549 A1 Oct. 2, 2025

(51) Int. Cl.

*H04N 19/42* (2014.01)
*H04N 19/103* (2014.01)
*H04N 19/136* (2014.01)
*H04N 19/172* (2014.01)
*H04N 19/503* (2014.01)
*H04N 19/593* (2014.01)

(52) U.S. Cl.

CPC ........... *H04N 19/42* (2014.11); *H04N 19/103* (2014.11); *H04N 19/136* (2014.11); *H04N 19/172* (2014.11); *H04N 19/503* (2014.11); *H04N 19/593* (2014.11)

(58) Field of Classification Search

CPC .... H04N 19/42; H04N 19/103; H04N 19/136; H04N 19/172; H04N 19/503; H04N 19/593

See application file for complete search history.

(56) References Cited

U.S. PATENT DOCUMENTS 9,621,926 B1 * 4/2017 Lee .................. H04N 21/44016
2012/0033727 A1 * 2/2012 Shor .................... H04N 19/132 375/E7.126
2012/0189056 A1 * 7/2012 Li .......................... H04N 19/96 375/E7.115
2015/0296215 A1 * 10/2015 Callahan ............. H04N 19/136 375/240.26
2024/0214582 A1 * 6/2024 Chong ................ H04N 19/154

* cited by examiner

*Primary Examiner* — Shahan Ur Rahaman
(74) *Attorney, Agent, or Firm* — FIG. 1 Patents

(57) ABSTRACT

Hybrid video encoding for improved encoding quality and encoding throughput is described. In one or more implementations, a system includes a processor configured to selectively enable one of a plurality of video encoders to encode each frame of a video sequence based on frame type of that individual frame and a directional encoding preference for the video sequence, and outputs a hybrid bitstream that interleaves each encoded frame into an order for decoding the video sequence. In one or more implementations, a computing device includes a plurality of video encoders and a processor to output a hybrid bitstream that interleaves each encoded frame of a respective bitstream obtained from each of the video encoders into the order for decoding the video sequence.

20 Claims, 5 Drawing Sheets

HYBRID VIDEO ENCODING SYSTEMS

BACKGROUND

Video encoding is performed in accordance with an encoding standard. Encoders are implemented as dedicated hardware or as specialized software routines that execute on processors. Hardware video encoders tend to be more energy efficient and consume less power compared to software video encoders. Software video encoders are reprogrammable to handle new versions of encoding tools and standards. Hardware video encoders are not easily upgradable and often limited by their original capability.

DETAILED DESCRIPTION

Figure 1:
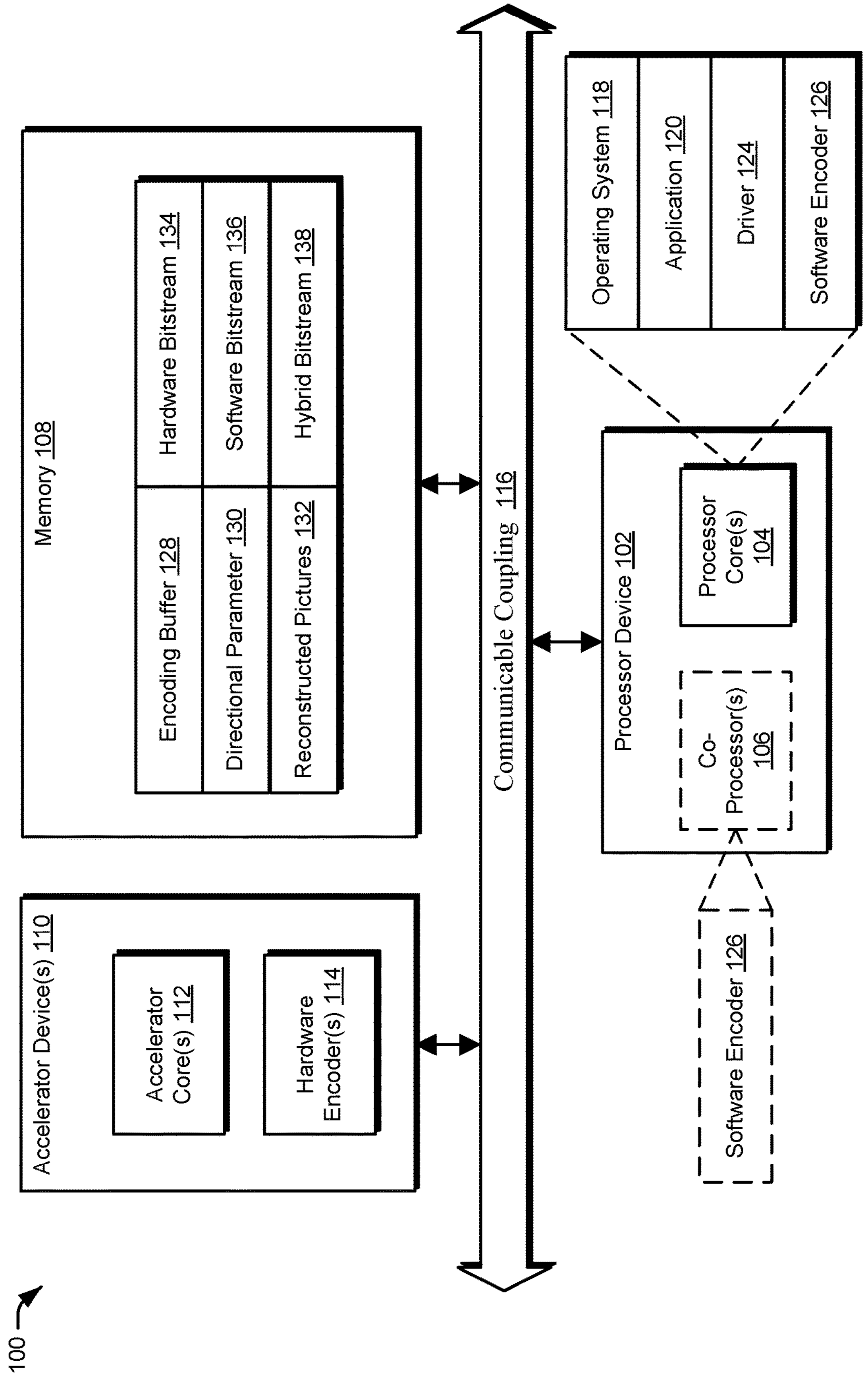
FIG. 1 is a block diagram of a non-limiting example system having a video encoding architecture that is operable to implement hybrid video encoding for improved encoding quality and encoding throughput.

Video encoding is performed on raw or uncompressed video data in accordance with an encoding standard. Each encoding standard specifies various sets of encoder capabilities, also known as profiles, to be used in different scenarios. The profiles define various levels of compression efficiency and computational complexity. To improve quality and performance, these standards evolve to support additional profiles, improved encoding tools, and advanced algorithms not defined by previous versions.

Hardware video encoders tend to be more energy efficient and consume less power than software video encoders, which execute on processing devices. Software encoders are upgradable through changes to source code while hardware encoders are not as flexible due to restrictions on design complexity, chip area, and a general inability to change post-production configurations without using new hardware. Common deficiencies of hardware encoders include unsupported profiles, slow encoding speeds, and inadequate motion estimation. When new standards are adopted, software encoders are used more frequently than less capable hardware encoders, which negatively affects energy consumption.

Hybrid video encoding systems are described. In one or more implementations, the techniques described herein improve encoding quality and throughput of multi-encoder systems by selectively processing each frame of video using one of a plurality of different types of encoders in furtherance of balanced energy consumption. By way of example, a system includes a plurality of encoders that have different capabilities. In one or more implementations, a first encoder is a software encoder, and a second encoder is a hardware encoder. In other implementations, the first and second encoders are each hardware encoders, or each software encoders, which have different capabilities. Hybrid video encoding enables the system to check each frame type and select either the first encoder or the second encoder having the profile support that is most suited to process that type of frame. Each encoder outputs an encoded bitstream, and those encoded bitstreams are interleaved together such that each encoded frame is placed in an order for decoding. The system outputs the encoded frames as a single hybrid-encoded bitstream that is ready for decoding.

For ease of description, hybrid video encoding is explained with reference to the advanced video coding (AVC) standard H.264. However, the described techniques are not limited to the H.264 standard and apply to all video encoding standards such as, but not limited to, the high efficiency video coding standard (HVEC) H.265, the VP9 standard, the MPEG-4 standard, the MPEG-2 standard, the MOV standard, the AV1 standard, and the WebM standard, to name just a few.

One aspect of implementing hybrid video encoding is selecting an encoder (e.g., a best encoder) to use for processing each frame. In terms of considerations for different encoder types, software encoders are updated with changing standards, while hardware encoders eventually become obsolete and do not support all profiles. Three commonly used profiles found in the H.264 standard include a baseline profile, a main profile, and a high profile. The baseline profile supports basic encoding features to provide low complexity encoding, which is suitable for video streaming applications in systems with limited processing power (e.g., mobile devices). The main profile builds upon the functionality of the baseline profile to support improved prediction algorithms that increase computational efficiency. The high profile achieves better compression ratios than the main and baseline profiles and is used to encode video for high quality (e.g., high resolution, high framerate) video applications, such as broadcasting and disc storage. The high profile defines several advanced encoding techniques, such as 8×8 intra predictions, 8×8 discrete cosine transformations (DCT), and 8×8 versus 4×4 adaptive spatial transformations. The latter are used to adaptively select either a 4×4 transformation or an 8×8 transformation based on complexity of pixels in that frame. The 4×4 transformation is selected for frames having detailed pixel areas, and the 8×8 transformation is selected to cause higher compression efficiency for picture areas with fewer details. Some hardware encoders do not support the high profile. Without high-profile support, a hardware encoder cannot leverage the advanced encoding tools of the H.264 standard.

Additionally, some hardware encoders suffer from a limited search range in motion estimation processes. The limited search range reduces compression efficiency. An encoder's rate-distortion optimization (RDO) improves quality of a compressed video. RDO effectiveness depends on that encoder's supported frame types, which define how, during motion estimation, a reference frame is selected. Common frame types include I-frames, P-frames, and B-frames. I-frames are "intra-coded" pictures or "intra-predicted" frames. Compression is lowest with I-frames because they do not use a reference frame for motion estimation, and instead focus on information contained in that I-frame. By way of contrast, P-frames, or "predicted" pictures, are a type of inter-predicted frame that are more compressible than I-frames because P-frames only indicate changes relative a previous frame, which is used as a reference. P-frames only store information about elements that have changed since the previous (reference) frame and ignore image portions that remain the same. P-frames are considered unidirectional because only previous frames are referenced. On the other hand, B-frames, or "bi-directionally predicted" pictures, are inter-predicted frames that are bidirectional. B-frames consider information within previous reference frames, as well as future (forward) reference frames. By storing differences relative to previous and future frames, higher-quality compression is achieved with B-frames. RDO performance of an encoder is heavily dependent on an encoder's ability to locate suitable reference frames among all reference frames available for a supported frame type. The performance impact is most significant with the presence of B-frames because of their larger search ranges. Locating a suitable reference frame from among multiple previous and future frames is more challenging in time and complexity than considering only previously encoded P-frames.

To encode each frame of a video sequence, the described system selects one type of encoder from a plurality of different types of encoders to leverage higher profile support and larger search ranges whenever possible. In one or more implementations, for instance, a bidirectional encoding parameter is checked by the system to determine whether a larger search range (e.g., made available from processing B-frames) is desired. Without bidirectional encoding enabled, the system selects the first encoder to process each I-frame in the sequence, and the system selects the second encoder to process each P-frame. When bidirectional encoding is enabled, the system selects the first encoder to process each I-frame and/or P-frame in the sequence, and the system selects the second encoder to process each B-frame. Through careful frame-by-frame selection of either the first encoder (e.g., the software encoder) or the second encoder (e.g., the hardware encoder), overall encoding quality and encoding throughput is improved, and balanced energy consumption is achieved.

In some aspects, the techniques described herein relate to a system including a processor configured to selectively enable one of a plurality of video encoders to encode a frame of a video sequence based on a frame type of the frame and a directional encoding preference for the video sequence, and output a hybrid bitstream that interleaves the encoded frame into an order with other encoded frames for decoding the video sequence.

In some aspects, the techniques described herein relate to a system, wherein the processor is configured to enable a first encoder from the plurality of video encoders to encode a first frame of the video sequence when the first frame includes a first frame type, and enable a second encoder from the plurality of video encoders to encode a second frame of the video sequence when the second frame includes a second frame type.

In some aspects, the techniques described herein relate to a system, wherein the first frame type is an intra-predicted frame type, and the second frame type is a bidirectional inter-predicted frame type.

In some aspects, the techniques described herein relate to a system, wherein the processor is configured to enable the first encoder to encode a third frame of the video sequence when the third frame includes a third frame type and the directional encoding preference is bidirectional, and enable the second encoder to encode the third frame when the third frame includes the third frame type and the directional encoding preference is unidirectional.

In some aspects, the techniques described herein relate to a system, wherein the third frame type is a unidirectional inter-predicted frame type.

In some aspects, the techniques described herein relate to a system, wherein the first encoder includes a software encoder, and the second encoder includes a hardware encoder.

In some aspects, the techniques described herein relate to a system, wherein the first encoder and the second encoder each include a hardware encoder.

In some aspects, the techniques described herein relate to a system, wherein the first encoder and the second encoder each include a software encoder.

In some aspects, the techniques described herein relate to a computing device including a plurality of video encoders including a first encoder and a second encoder, and a processor configured to selectively enable the first encoder to encode a first frame of a video sequence based on a frame type of the first frame and a directional encoding preference for the video sequence, obtain an encoded second frame of the video sequence from the second encoder, and output a hybrid bitstream that interleaves the first encoded frame with the second encoded frame into an order for decoding the video sequence.

In some aspects, the techniques described herein relate to a computing device further including a co-processor configured to execute the first encoder or the second encoder as a software encoder.

In some aspects, the techniques described herein relate to a computing device, further including dedicated hardware configured to implement the first encoder or the second encoder as a hardware encoder.

In some aspects, the techniques described herein relate to a computing device, wherein the processor is configured to execute a driver that outputs the hybrid bitstream to an application or operating system associated with the video sequence.

In some aspects, the techniques described herein relate to a computing device, wherein the directional encoding preference is set by the application or operating system associated with the video sequence.

In some aspects, the techniques described herein relate to a computing device, wherein the processor is configured to input a reconstructed picture associated with the first encoded frame into the second encoder as a reference frame used to encode the second frame.

In some aspects, the techniques described herein relate to a computing device, wherein the processor is configured to enable the first encoder to encode a third frame of the video sequence when a frame type of the third frame includes a first frame type, and enable the second encoder to encode the third frame when a frame type of the third frame includes a second frame type.

In some aspects, the techniques described herein relate to a computing device, wherein the processor is configured to enable the first encoder to encode the third frame when the frame type of the third frame includes a third frame type and the directional encoding preference is bidirectional, and enable the second encoder to encode the third frame when the frame type of the third frame includes the third frame type and the directional encoding preference is unidirectional.

In some aspects, the techniques described herein relate to a computing device, wherein the processor is configured to input a reconstructed picture associated with the third frame into the second encoder as a reference frame used to encode the second frame.

In some aspects, the techniques described herein relate to a computing device, wherein the first encoder includes a software encoder, and the second encoder includes a hardware encoder.

In some aspects, the techniques described herein relate to a computing device, wherein the first encoder and the second encoder each include a hardware encoder, or the first encoder and the second encoder each include a software encoder.

In some aspects, the techniques described herein relate to a method including receiving, by a processor, a video sequence, determining a directional encoding preference for the video sequence, selectively enabling one of a plurality of video encoders to encode a frame of the video sequence based on a frame type of the frame and the directional encoding preference for the video sequence, and outputting a hybrid bitstream that interleaves the encoded frame into an order with other encoded frames for decoding the video sequence.

FIG. 1 is a block diagram of a non-limiting example system 100 having a video encoding architecture that is operable to implement hybrid video encoding for improved encoding quality and encoding throughput. In this example, the system 100 includes a processor device 102, which is depicted having one or more processor cores 104 and optionally, one or more co-processors 106. The system also includes a memory 108 and one or more accelerator devices 110, which are depicted having one or more accelerator cores 112 and one or more hardware encoders 114, which are implemented as dedicated hardware on the accelerator devices 110.

In accordance with the described techniques, the processor device 102, the memory 108, and the accelerator devices 110 are communicably couplable via communicable coupling 116, an example of which is a system bus, but additional and/or different wired or wireless connections are usable in variations. Further, one or more of the various components of the processor device 102 (e.g., one or more of the processor cores 104, one or more of the co-processors 106, one or more interfaces) are communicably coupled via wired or wireless connections, and one or more of the various components of the accelerator devices 110 (e.g., one or more of the accelerator cores 112, one or more of the hardware encoders 114, one or more interfaces) are communicably coupled via wired or wireless connections. Example wired connections include, but are not limited to, memory channels, buses (e.g., a data bus, a system or address bus), interconnects, through silicon vias, traces, pins and sockets, and planes, to name just a few. Other example connections include optical connections, fiber optic connections, and/or connections or links based on quantum entanglement.

It is to be appreciated that in variations, the processor device 102, the memory 108, and/or the accelerator devices 110 include more, fewer, and/or different hardware components without departing from the spirit or scope of the described techniques, e.g., cache, semiconductor intellectual property (IP) core, networking interface and/or controller, etc. In the illustrated example, the memory 108 and the accelerator devices 110 are depicted separately from the processor device 102, and the memory 108 and the accelerator devices 110 are connectable for communication via the communicable coupling 116. In one example for instance, an interface of the memory 108 and/or the accelerator devices 110 is operable with an interface of the processor device 102. In at least one variation, though, the memory 108, the accelerator devices 110, and the processor device 102 are incorporated as part of a common circuit board, e.g., a shared printed circuit board. For instance, the memory 108, the accelerator devices 110, and the processor device 102 are incorporated in a system-on-chip (SoC) or system-on-package (SoP).

Examples of devices or apparatuses in which the system 100 is implemented include, but are not limited to, one or more server computers, a personal computer (e.g., a desktop or tower computer), a smartphone or other wireless phone, a tablet or phablet computer, a notebook computer, a laptop computer, a wearable device (e.g., a smartwatch, an augmented reality headset or device, a virtual reality headset or device), an entertainment device (e.g., a gaming console, a portable gaming device, a streaming media player, a digital video recorder, a music or other audio playback device, a television, a set-top box), an Internet of Things (IoT) device, an automotive computer, and other computing devices or systems.

The processor device 102 and the accelerator devices 110 are electronic circuits that perform various operations on and/or using data in the memory 108. Examples of the processor device 102 and the accelerator devices 110 include, but are not limited to, a central processing unit (CPU), a graphics processing unit (GPU), a field programmable gate array (FPGA), an accelerator, an accelerated processing unit (APU), and a digital signal processor (DSP), to name a few. The processor cores 104, the co-processors 106, and the accelerator cores 112 are individual processing units that read and execute instructions (e.g., of a program), examples of which include to add, to move data, and to branch. In some variations, the processor cores 104, the co-processors 106, and/or the accelerator cores 112 include multiple cores (i.e., the processor device 102 is a multi-core processor, the accelerator device 110 is a multi-core accelerator). In other variations, the processor cores 104, the co-processors 106, and/or the accelerator cores 112 include only one core (i.e., the processor cores 104 include a single processor core, the accelerator cores 112 include a single accelerator core).

In at least one example, the memory 108 is a memory module. The memory 108 is a device or system that is used to store information, such as for immediate use in a device, e.g., by the processor device 102, by the accelerator devices 110, or by an in-memory processor (not shown), which is referred to as a processing-in-memory component or PIM component. In one or more implementations, the memory 108 corresponds to semiconductor memory where data is stored within memory cells on one or more integrated circuits. In at least one example, the memory 108 corresponds to or includes volatile memory, examples of which include random-access memory (RAM), dynamic random-access memory (DRAM), synchronous dynamic random-access memory (SDRAM), static random-access memory (SRAM), and memristors. The memory 108 includes a plurality of the memory or, in at least one variation, the memory 108 includes a single physical memory. It is to be appreciated that the memory 108 is configurable with any number of memory (e.g., physical memory) without departing from the spirit or scope of the described techniques.

The memory 108 is packaged, arranged, and/or configured in any of a variety of different manners. Examples of such packaging or configuring include a dual in-line memory module (DIMM), a small outline DIMM (SO-DIMM), a registered DIMM (RDIMM), a mux RDIMM (MRDIMM), a non-volatile DIMM (NVDIMM), a ball grid array (BGA) memory permanently attached to (e.g., soldered to) a printed circuit board, and so forth. Examples of types of DIMMs include, but are not limited to, synchronous dynamic random-access memory (SDRAM), double data rate (DDR) SDRAM, double data rate 2 (DDR2) SDRAM, double data rate 3 (DDR3) SDRAM, double data rate 4 (DDR4) SDRAM, and double data rate 5 (DDR5) SDRAM. In at least one variation, the memory 108 is configured as or includes a SO-DIMM, an RDIMM, or an MRDIMM according to one of the above-mentioned standards, e.g., DDR, DDR2, DDR3, DDR4, and DDR5.

Alternatively or in addition, the memory 108 corresponds to or includes non-volatile memory, examples of which include flash memory, read-only memory (ROM), programmable read-only memory (PROM), erasable programmable read-only memory (EPROM), electronically erasable programmable read-only memory (EEPROM), and non-volatile random-access memory (NVRAM), such as phase-change memory (PCM) and magneto resistive random-access memory (MRAM). The memory 108 is configurable in a variety of ways capable of supporting hybrid video encoding for improved encoding quality and encoding throughput.

Further examples of memory configurations include low-power double data rate (LPDDR), also known as LPDDR SDRAM, which is a type of synchronous dynamic random-access memory. In variations, LPDDR consumes less power than other types of memory and/or has a form factor suitable for mobile computers and devices, such as mobile phones. Examples of LPDDR include, but are not limited to, low-power double data rate 2 (LPDDR2), low-power double data rate 3 (LPDDR3), low-power double data rate 4 (LPDDR4), and low-power double data rate 5 (LPDDR5). It is to be appreciated that the memory 108 is configurable in a variety of ways without departing from the spirit or scope of the described techniques.

The processor device 102 is configured to execute instructions or code that performs computing functions, routines, and processes. The processor device 102 executes these instructions on the processor cores 104 and/or the co-processors 106. As depicted, the executable instructions are associated with an operating system 118 (or platform), an application 120, a driver 124 (e.g., a device driver), and a software encoder 126. In at least one example, the processor cores 104 execute the operating system 118, the application 120, the driver 124, and the software encoder 126. In one or more implementations, the processor device 102 offloads the software encoder 126 for parallel execution on the co-processors 106.

The operating system 118 manages interactions between hardware and software resources of the system 100. As a software program, the operating system 118 serves as an intermediary between computer hardware (e.g., the processor device 102, the memory 108, the accelerator devices 110) and software applications (e.g., the application 120, the driver 124, and the software encoder 126) to provide system services and functions that enable the applications to perform tasks. The underlying hardware architecture of the system 100 is abstracted by the operating system 118 to allow software functions to execute without referencing specific hardware details. Resource management is performed by the operating system 118 to fairly manage processing time, memory, storage, and input/output resources in ways that improve computing speed and efficiency. Allocation and deallocation of the memory 108 is managed by the operating system 118. The operating system 118 initiates, schedules, and terminates processes to enable multiple applications to run concurrently. Other functions of the operating system 118 include file system services, user interface functions, security, and protection tasks, as well as communication and networking operations.

The application 120 is a software program that performs specific tasks or functions for the system 100, including video processing functions that require video encoding. In one or more implementations, the application 120 provides video streaming, video recording, video playback, and/or other video processing functions.

The driver 124 represents a specialized software component that acts as an interface between the operating system 118 and one or more hardware devices or low-level software services of the system 100. The application 120 and/or the operating system 118 rely on the driver 124 to communicate and interact with the hardware encoder 114 and the software encoder 126. The driver 124 provides an application programming interface (API) to one or more of the hardware components or low-level software services in the system 100, which enables the operating system 118 to effectively control the system 100 on behalf of the application 120.

The system 100 includes a plurality of video encoders with different capabilities. As depicted, two of the video encoders include the software encoder 126 (referred to throughout as "a first encoder") and the hardware encoder 114 (referred to throughout as "a second encoder"), each of which are operable to convert digital video data (e.g., files, signals, streams) from one format to another by compressing and encoding the video data to be suitable for storage, transmission, or playback on various devices. The software encoder 126 is a software program that runs on the processor device 102 to encode, and thereby compress, video data. In contrast, the hardware encoder 114 encodes video data using specialized hardware and logic that is part of the accelerator device 110 and separate from the accelerator core 112. In some implementations, the system 100 includes different versions of the hardware encoder 114, or different versions of the software encoder 126.

The software encoder 126 and the hardware encoder 114 each operate according to one or more video encoding standards. In some aspects, the software encoder 126 supports one or more high-profile features that are unsupported by the hardware encoder 114, although in motion estimation, the hardware encoder 114 does allow a larger search range (e.g., B-frames) to be used. The software encoder 126 and the hardware encoder 114 each use one or more compression algorithms that reduce an amount of memory 108 required to store video data, without significantly compromising quality. Besides compression, other functions of the software encoder 126 and the hardware encoder 114 include bitrate control and adjustments to resolution and frame rate. The bitrate of video data represents the amount of video data processed per unit of time. The software encoder 126 and the hardware encoder 114 adjust the bitrate during encoding to achieve a desired balance between video file size and video quality. The resolution and frame rate are adjusted by the software encoder 126 and the hardware encoder 114 to satisfy playback constraints defined by the operating system 118 and/or the application 120.

In some aspects, the driver 124 manages encoding processes within the system 100, including to control how video data is encoded. The driver 124 selectively enables either the hardware encoder 114 or the software encoder 126 to encode each individual frame of a video sequence waiting to be compressed.

The memory 108 stores data used by the hardware and software components of the system 100. As depicted, the memory 108 includes an encoding buffer 128, a directional parameter 130, one or more reconstructed pictures 132, a hardware bitstream 134, a software bitstream 136, and a hybrid bitstream 138.

The encoding buffer 128 is used as a source of raw or pre-processed video data that is waiting to be encoded. The application 120 and/or the operating system 118 write video data to the encoding buffer 128 at which the uncompressed video data is maintained as a sequence of individual video frames. The sequence of video frames has a temporal order or spatial order. The temporal order defines a time order for playback. The spatial order defines a logical order applied by a compression algorithm. In some implementations, the encoding buffer 128 is a single buffer, and in other implementations the encoding buffer 128 provides multiple pre-processed video buffers. The hardware encoder 114 and the software encoder 126 compress and encode each frame obtained from the encoding buffer 128 to generate encoded video data.

In accordance with the described techniques, the driver 124 inputs each individual frame of a video sequence into either the hardware encoder 114 or the software encoder 126. In some aspects, the driver 124 provides a first individual frame from the encoding buffer 128 as an input to the software encoder 126 and a second individual frame from the encoding buffer 128 as an input to the hardware encoder 114. In one or more implementations, inputs to the hardware encoder 114 and the software encoder 126 are pointers to locations in the memory 108 where the input frames and/or the encoding buffer 128 are stored.

The directional parameter 130 is stored in the memory 108 to indicate whether bidirectional encoding processes within the system 100 are enabled. The driver 124 reads the directional parameter 130 to determine whether to enable one-way (i.e., previous frame, P-frame) or two-way (i.e., previous and future frame, P-frame and B-frame) inter-frame predictions. When the directional parameter 130 is disabled, inter-frame predictions are limited to using previous frames. When the directional parameter 130 is enabled, future frames and previous frames are allowed in making inter-frame predictions. In some implementations, the operating system 118 sets the directional parameter 130 to cause two-way inter-predictions to be enabled or disabled. In other implementations, the application 120 sets the directional parameter. In some aspects, the directional parameter 130 is set based on user input. The operating system 118 and/or the application 120 provide a user interface for receiving user input to designate the directional parameter 130 and the directional encoding scheme of the system 100. In some cases, the directional parameter 130 is set without user input (e.g., based on a configuration file, based on one or more rules).

The reconstructed pictures 132 are generated during encoding processes performed by the software encoder 126 to enable subsequent decoding, as well as other encoding processes performed by the hardware encoder 114. In one or more implementations, each of the reconstructed pictures 132 is used during decoding to reconstruct visual content of the original video data. Each of the reconstructed pictures 132 represents an approximation of one of the original video frames in the encoding buffer 128 and is used a reference frame to enable inter-frame encoding predictions performed by the hardware encoder 114. In the context of the H.264 standard and some other encoding standards, the reconstructed pictures include a mixture of I-frames and P-frames.

The hardware bitstream 134 corresponds to encoded video data output from the hardware encoder 114, and the software bitstream 136 corresponds to encoded video data output from the software encoder 126. Some of the video data contained in the encoding buffer 128 is encoded into the hardware bitstream 134 and a remainder of the video data found within the encoding buffer 128 is encoded into the software bitstream 136. The hardware bitstream 134 and the software bitstream 136 each include a sequential arrangement of bits used to represent a compressed and encoded version of a portion of the video data maintained in the encoding buffer 128. Subsequent decoding processes are enabled based on additional information contained in these arrangements of bits.

Using the hardware encoder 114 tends to be more energy efficient than executing the software encoder 126. The software encoder 126 is upgradable to handle advanced encoding tools and standards, whereas the hardware encoder 114 is not easily changed. In accordance with the described techniques, the system 100 implements hybrid video encoding, where the more capable software encoder 126 assists the more efficient hardware encoder 114, to balance energy consumption, while improving encoding quality and throughput, overall. The result of this hybrid implementation is the hybrid bitstream 138.

The hybrid bitstream 138 is a compressed and efficient form of the original video data maintained in the encoding buffer 128, which enables more efficient storage, transmission, and decoding for playback. The hybrid bitstream 138 is a single bitstream having been encoded using two different encoders. To produce the hybrid bitstream 138, encoded data from the hardware bitstream 134 is combined with encoded data from the software bitstream 136. In some aspects, the driver 124 interleaves the hardware bitstream 134 with the software bitstream 136 to produce the hybrid bitstream 138. As such, the hybrid bitstream 138 represents an encoding of all the video data obtained from the encoding buffer 128.

To implement hybrid video encoding and eventually generate the hybrid bitstream 138 of a video sequence, the processor device 102 is configured to selectively enable, on a frame-by-frame basis, one of a plurality of video encoders for encoding each individual frame. Each frame-specific encoder selection is based on a specific property of that frame (e.g., a frame type) and a directional encoding preference for all the frames (e.g., bidirectional encoding enabled, bidirectional encoding disabled). In some implementations, for each frame contained in the encoding buffer 128, the driver 124 executes on the processor device 102 and performs a frame-specific operation to selectively enable either a first encoder (e.g., the software encoder 126) or a second encoder (e.g., the hardware encoder 114) to encode that individual frame.

For each frame to be encoded, the processor device 102 is configured to choose one video encoder over another based on at least two conditions: whether bidirectional inter-frame predictions are enabled for the system 100 generally, and whether an individual frame to be encoded is an intra-predicted frame (e.g., I-frame), a unidirectional inter-predicted frame (e.g., P-frame), or a bidirectional inter-predicted frame (e.g., B-frame). The driver 124 selectively enables the software encoder 126 to encode a first video frame of a first frame type (e.g., I-frame, I-frame or P-frame), and the hardware encoder 114 is selectively enabled by the driver 124 to encode a second video frame of a second frame type (e.g., P-frame, B-frame).

In one or more implementations, the application 120 writes video data for a video sequence to the memory 108 and executes a function call to request that the driver 124 fill the encoding buffer 128 with the video data and encode the video sequence. By way of example, the driver 124 determines that the encoding buffer 128 contains video data ready for encoding, and individually controls how each of the video frames is encoded. To determine whether to use the software encoder 126 or the hardware encoder 114, the driver 124 reads the directional parameter 130 to determine whether bidirectional encoding is allowed. If the directional parameter 130 is set to enable bidirectional encoding, the driver 124 uses the hardware encoder 114 to encode bidirectional frames, which require a larger search range, and enables the software encoder 126 to use advanced encoding tools for encoding intra-predicted frames and frames that are unidirectional.

In some implementations, when the directional parameter 130 is enabled, the software encoder 126 is selectively enabled by the driver 124 to encode intra-predicted frames (e.g., I-frames) or unidirectional inter-predicted frames (e.g., P-frames), and the hardware encoder 114 is selectively enabled by the driver 124 to encode bidirectional inter-predicted frames (e.g., B-frames). In some implementations, when the directional parameter 130 is disabled, no bidirectional encoding is performed by the system 100. Instead, the software encoder 126 is selectively enabled by the driver 124 to encode intra-predicted frames (e.g., I-frames), and the hardware encoder 114 is selectively enabled by the driver 124 to encode unidirectional inter-predicted frames (e.g., P-frames).

Figure 2:
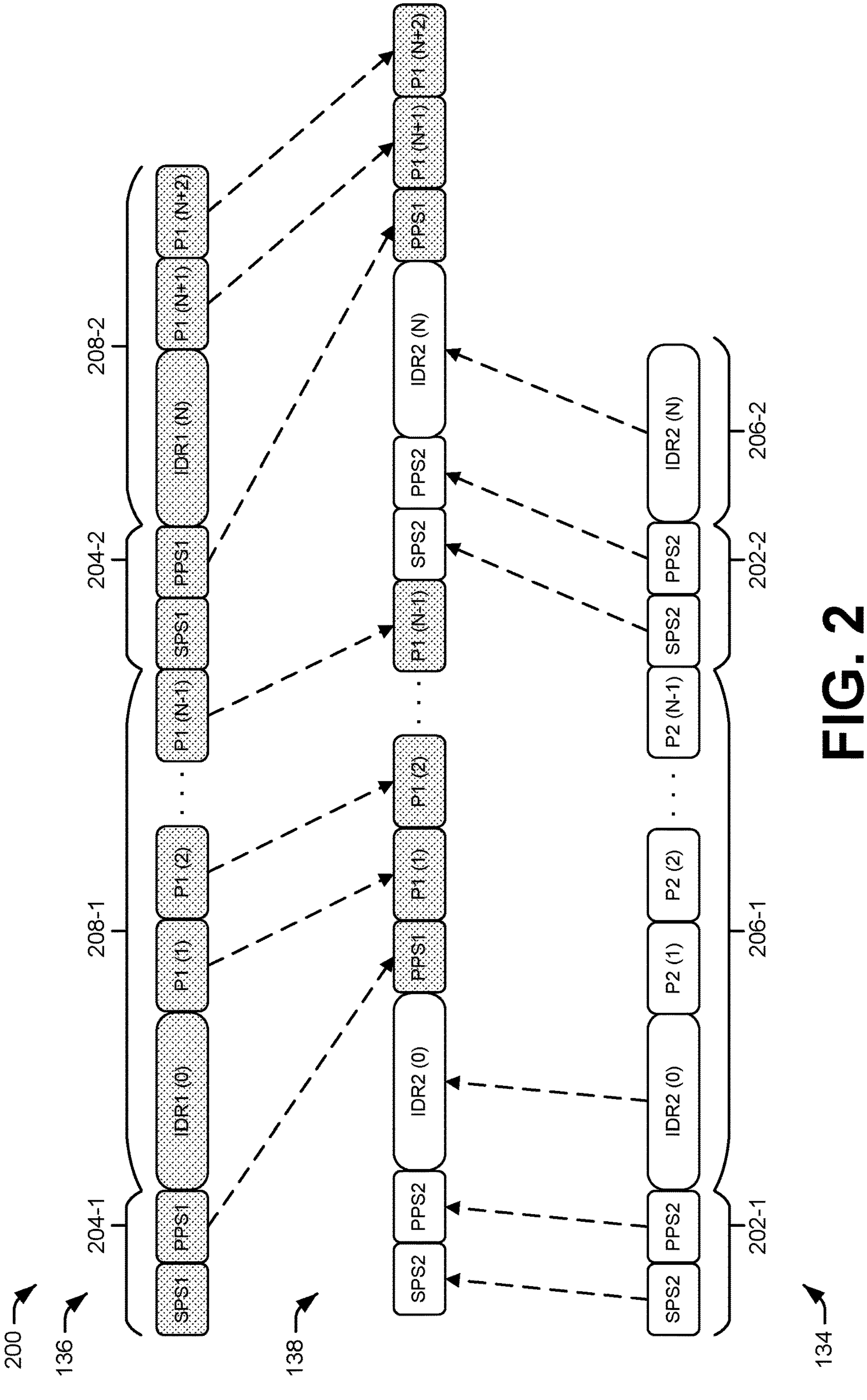
FIG. 2 depicts a non-limiting example of a hybrid bitstream generated from a hybrid video encoding system.

FIG. 2 depicts a non-limiting example 200 of a hybrid bitstream generated from a hybrid video encoding system. The example 200 depicts one detailed example of the hardware bitstream 134, the software bitstream 136, and the hybrid bitstream 138 included in FIG. 1. The details shown in FIG. 2 represent one H.264 example of these bitstreams, and many other variations are possible. In the context of the H.264 standard, each of the bitstreams 134, 136, and 138 includes different coded sections, labeled as "SPS", "PPS", "IDR", and "P". Each of these coded sections is either metadata or compressed video data. The metadata frames are labeled in the bitstreams 134 and 136, respectively, as metadata 202-1/202-2 and 204-2/204-2. The compressed video data frames are labeled in the bitstreams 134 and 136, respectively, as video frames 206-1/206-2 and 208-1/208-2.

The metadata 202-1/202-2 and 204-1/204-2 include the SPS and the PPS frames, contain information about an encoded video sequence, which is used by a decoder to reconstruct the video sequence. SPS stands for sequence parameter set and PPS stands for picture parameter set. The SPS and PPS frames each contain information that an H.264 decoder needs to decode the video data, for example, the resolution and frame rate of the video. The SPS frames contain parameters that apply to a series of consecutive coded video pictures, referred to as a "coded video sequence" in the H.264 standard. The PPS frames contain parameters that apply to the decoding of one or more individual pictures inside a coded video sequence.

The video frames 206-1/206-2 and 208-2/208-2 include the IDR and the P frames, which include information about I-frames, P-frames, and/or B-frames, along with their motion vectors and other information used to reconstruct the video sequence. IDR stands for instantaneous decoder refresh and are a specific type of keyframe used in the H.264 standard to provide reset points for the decoder, allowing for error resilience and efficient random access. IDR frames are intra-predicted frames (e.g., I-frames), and as such, do not require any other frames to decode the image correctly. P stands for picture and represents a P-frame or a B-frame of compressed video.

In one or more implementations, the driver 124 implements the encoding process to create the two different bitstreams 134 and 136 in the memory 108. The software encoder 126 produces the software bitstream 136, and the hardware encoder 114 creates the hardware bitstream 134. To allow the encoded frames of the video sequence to subsequently be decoded, the driver 124 combines these two separate bitstreams into the hybrid bitstream 138, which is a single, unified bitstream created for decoding all the frames in the video sequence. As depicted, the hybrid bitstream 138 includes the metadata 202-1 and a portion of the video frames 206-1, which is followed by a portion of the metadata 204-1 and a portion of the video frames 208-1, which is followed by the metadata 202-2 and the video frames 206-2, and which is followed by a portion of the metadata 204-2 and a portion of the video frames 208-2.

Figure 3:
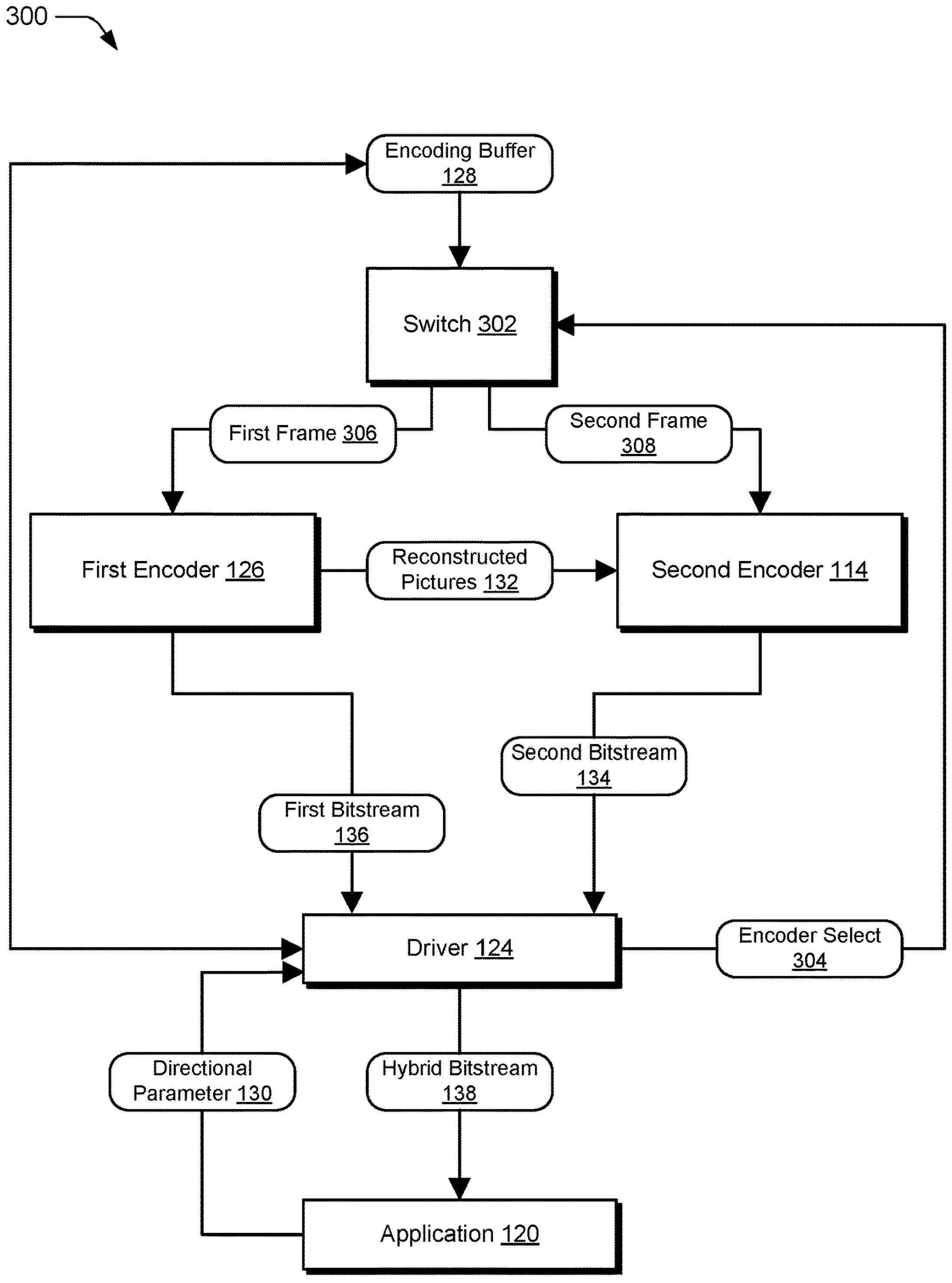
FIG. 3 depicts a non-limiting example of various data paths used in connection with one or more implementations of hybrid video encoding for improved encoding quality and encoding throughput.

FIG. 3 depicts a non-limiting example 300 of various data paths used in connection with one or more implementations of hybrid video encoding for improved encoding quality and encoding throughput. The example 300 shows data connections enabled between various elements of the system 100, in addition to a switch 302 driven by an encoder select signal 304. The encoder select signal 304 is controlled by the driver 124 and is used to enable a first encoding path through the first encoder 126 or a second encoding path through the second encoder 114.

By way of example, the processing device 102 executes the application 120 and the driver 124. Each frame of a video sequence is input to the encoding buffer 128, and the directional parameter 130 is set by the application 120 or the operating system 118. The driver 124 has visibility into the encoding buffer 128 to determine a frame type of each video frame. When the directional parameter 130 is set to unidirectional encoding, only two frame types are available, which include an intra-predicted frame type (e.g., I-frame) and a unidirectional inter-predicted frame type (e.g., P-frame). When the directional parameter 130 is set to bidirectional encoding, there are three available frame types, which include the intra-predicted frame type, the unidirectional inter-predicted frame type, and a bidirectional inter-predicted frame type (e.g., B-frame). Based on the frame types and the directional parameter 130, the driver 124 causes the encoder select signal 304 to send a video frame through the switch 302 to be encoded either by the first encoder 126 or the second encoder 114.

In one or more implementations, when unidirectional encoding is designated by the directional parameter 130 (i.e., bidirectional encoding is disabled), a first frame type is an intra-predicted frame, and a second frame type is a unidirectional inter-predicted frame. The driver 124 controls the encoder select signal 304 to control the switch 302 and enable the first encoder 126 to encode the first frame 306 that is of the first frame type. For a second frame 308 that is of the second frame type, the driver 124 controls the encoder select signal 304 to control the switch 302 and enable the second encoder 114 to encode the second frame 308. To encode the second frame 308 of the second frame type (e.g., unidirectional inter-predicted frame type), the reconstructed pictures 132 generated from the first encoder 126 in response to encoding the first frame 306 (e.g., an inter-predicted frame) are input to the second encoder 114 to be used as reference frames for encoding the second frame 308 of the second frame type.

In one or more implementations, when bidirectional encoding is designated by the directional parameter 130 (i.e., bidirectional encoding is enabled), a first frame type is an intra-predicted frame, a second frame type is a unidirectional inter-predicted frame, and a third frame type is a bidirectional inter-predicted frame. The driver 124 controls the encoder select signal 304 to control the switch 302 and enable the first encoder 126 to encode the first frame 306 that is of the first frame type or the second frame type. For a second frame 308 that is of the third frame type, the driver 124 controls the encoder select signal 304 to control the switch 302 and enable the second encoder 114 to encode the second frame 308. To encode the second frame 308 of the third frame type (e.g., bidirectional inter-predicted frame type), the reconstructed pictures 132 generated from the first encoder 126 in response to encoding the first frame 306 (e.g., an inter-predicted frame, a unidirectional inter-predicted frame) are input to the second encoder 114 to be used as reference frames for encoding the second frame 308 of the third frame type.

Encoded frames output from the first encoder 126 are included in the first bitstream 136, and encoded frames output from the second encoder 114 are included in the second bitstream 134. The driver 124 combines the first bitstream 136 with the second bitstream 134 to interleave encoded frames from each of the encoders 126 and 114 into the hybrid bitstream 138, which is output to the application 120.

Through careful frame-by-frame selection of either the first encoder 126 (e.g., a software encoder) or the second encoder 114 (e.g., a hardware encoder), overall encoding quality and encoding throughput is improved, and a balanced energy consumption is achieved. In various implementations, the first encoder 126 and the second encoder 114 represent, respectively, a software encoder and a hardware encoder. In other implementations, the first encoder 126 and the second encoder 114 each represent software encoders of differing capabilities, or hardware encoders of differing capabilities.

The first encoder 126 is configured to perform more advanced encoding techniques than the second encoder 114, which increases quality of the encoded data. The quality gain is not limited to the first bitstream 136 (e.g., software encoded frames) generated with the first encoder 126 because the reconstruction pictures 132 are used as reference frames for the second encoder 114 to generate the second bitstream 134. Quality improvements begin at the first encoder 126 and are propagated to the second encoder 114 for generating the second bitstream 134 (e.g., hardware encoded frames), resulting in an overall quality gain realized in the entire hybrid bitstream 138.

The second encoder 114 is configured to perform long range predictions while consuming less power than the first encoder 126. The energy savings incurred from using hybrid video encoding enables a balance load between the processing device 102 and the accelerator device 110, which contains the hardware encoder 114. By distributing frames of a video sequence between being processed by two different encoders (e.g., software and hardware encoders), a higher overall encoding throughput is achievable.

Figure 4:
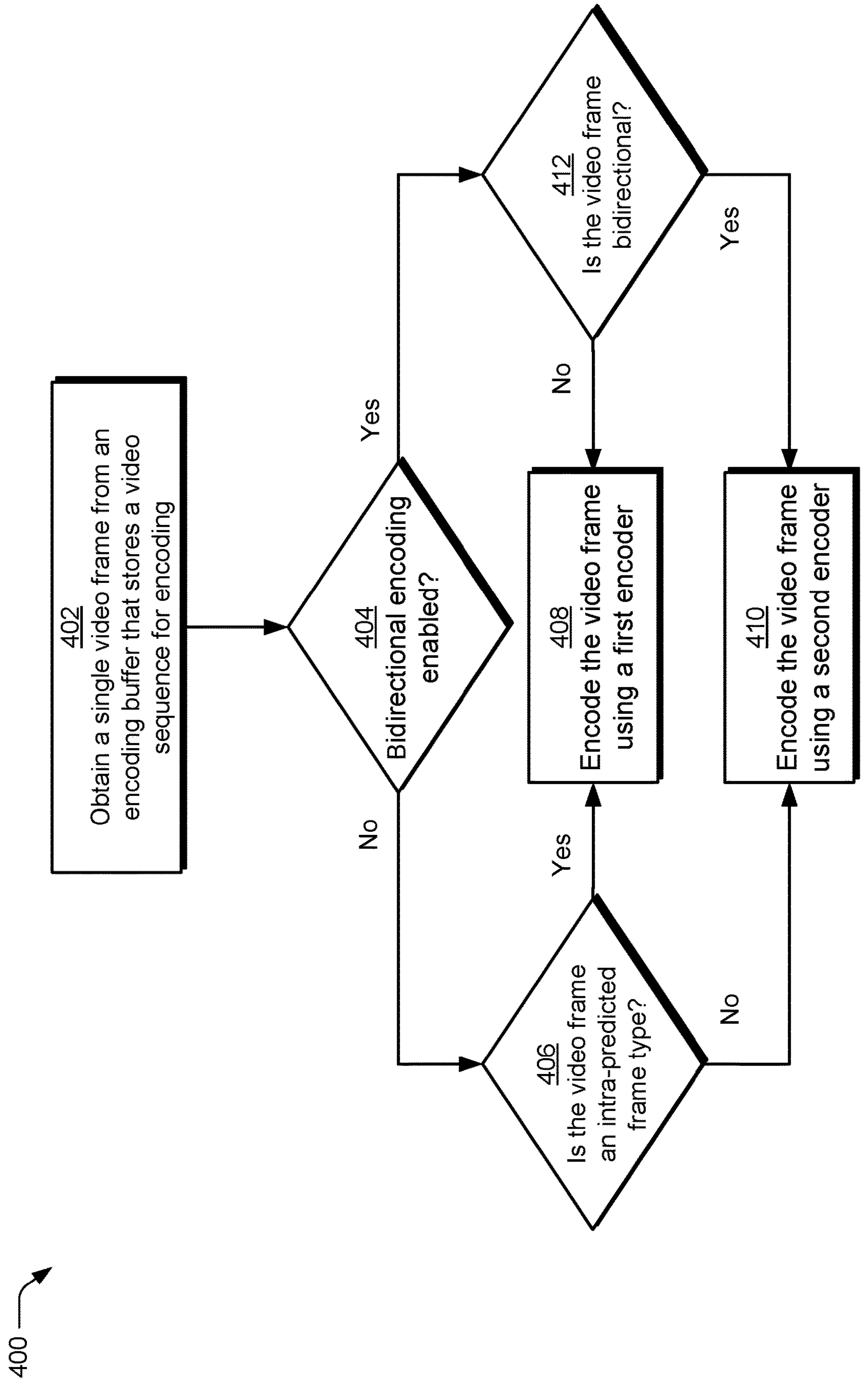
FIG. 4 depicts a procedure in an example implementation of hybrid video encoding for improved encoding quality and encoding throughput.

FIG. 4 is a non-limiting example 400 of various operations performed and communications used in connection with one or more implementations of hybrid video encoding for improved encoding quality and encoding throughput.

A single video frame is obtained from an encoding buffer that stores a video sequence for encoding (block 402). In one or more implementations, the processing device 102 retrieves a single frame of a video sequence from the encoding buffer 128.

Whether bidirectional encoding is enabled is determined (block 404). By way of example, the processing device 102 checks the directional parameter 130 to determine whether bidirectional inter-predicted frames (e.g., B-frames) are allowed. A "No" path from the block 404 is taken when the directional parameter 130 indicates bidirectional inter-predicted frames are not allowed, and a "Yes" path from the block 404 is taken when the directional parameter 130 indicates bidirectional inter-predicted frames are allowed.

In response to determining that bidirectional encoding is disabled, and after following the "No" path from the block 404, whether the single video frame is an intra-predicted frame type is determined (block 406). By way of example, the processing device 102 identifies a frame type of the single video frame. With bidirectional encoding disabled, the possible frame type is an intra-predicted frame (e.g., I-frame) or a unidirectional inter-predicted frame (e.g., P-frame). A "Yes" path from the block 406 is taken when the frame type corresponds to an intra-predicted frame, and a "Yes" path from the block 406 is taken when the frame type corresponds to a unidirectional inter-predicted frame.

After following the "Yes" path from the block 406, the video frame is encoded using a first encoder (block 408). By way of example, the software encoder 126 encodes the single video frame.

After following the "No" path from the block 406, the video frame is encoded using a second encoder (block 410). By way of example, the hardware encoder 114 encodes the single video frame. The hardware encoder 114 receives the reconstructed pictures 132 generated by the first encoder from encoding one or more previous frames to use as reference frames for encoding the single video frame.

In response to determining that bidirectional encoding is enabled, and after following the "Yes" path from the block 404, whether the single video frame is a bidirectional inter-predicted frame type is determined (block 412). By way of example, the processing device 102 identifies a frame type of the single video frame. With bidirectional encoding enabled, the possible frame types are an intra-predicted frame (e.g., I-frame), a unidirectional inter-predicted frame (e.g., P-frame), or a bidirectional inter-predicted frame (e.g., B-frame). A "No" path from the block 412 is taken when the frame type corresponds to an intra-predicted frame or a unidirectional inter-predicted frame, and a "Yes" path from the block 412 is taken when the frame type corresponds to a bidirectional inter-predicted frame.

After following the "No" path from the block 412, the video frame is encoded using the first encoder (block 408). By way of example, the software encoder 126 encodes the single video frame.

After following the "Yes" path from the block 412, the video frame is encoded using the second encoder (block 410). By way of example, the hardware encoder 114 encodes the single video frame. The hardware encoder 114 receives the reconstructed pictures 132 generated by the first encoder from encoding one or more previous frames to use as reference frames for encoding the single video frame.

Figure 5:
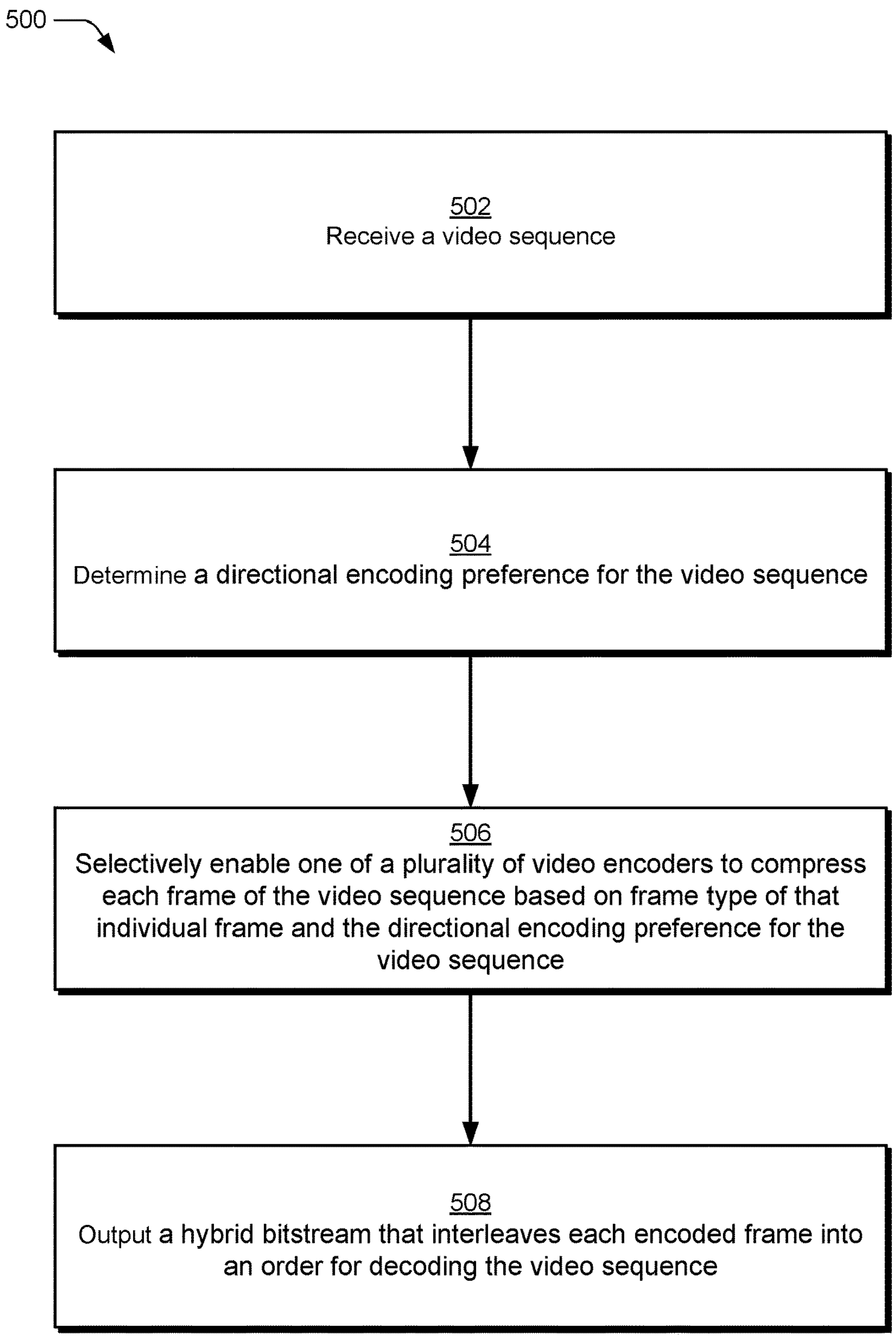
FIG. 5 depicts a procedure in an example implementation of hybrid video encoding for improved encoding quality and encoding throughput.

FIG. 5 depicts a procedure in an example 500 implementation of hybrid video encoding for improved encoding quality and encoding throughput.

A video sequence is received (block 502). In one or more implementations, the application 120 or the operating system 118 send video data to the driver 124 for inclusion in the encoding buffer 128.

A directional encoding preference for the video sequence is determined (block 504). By way of example, the application 120 or the operating system 118 set the directional parameter 130 to enable or disable bidirectional encoding.

The driver 124 determines whether bidirectional encoding is enabled or disabled by reading the directional parameter 130 from the memory 108.

One of a plurality of video encoders is selectively enabled to encode each frame of the video sequence based on frame type of that individual frame and the directional encoding preference for the video sequence (block 506). By way of example, when the directional parameter 130 indicates bidirectional encoding is disabled, the driver 124 causes the software encoder 126 to encode intra-predicted frames, and the driver 124 uses the hardware encoder 114 to encode unidirectional inter-predicted frames. When the directional parameter 130 indicates bidirectional encoding is enabled, the driver 124 causes the software encoder 126 to encode intra-predicted frames and unidirectional inter-predicted frames, and the driver 124 uses the hardware encoder 114 to encode bidirectional inter-predicted frames.

A hybrid bitstream that interleaves each encoded frame into an order for decoding the video sequence is output (block 508). By way of example, the driver 124 obtains portions of the software bitstream 136 and arranges them relative to portions of the hardware bitstream 134. The driver 124 produces a unified bitstream (i.e., the hybrid bitstream 138) that includes encoded data from the software encoder 126 and encoded data from the hardware encoder 114. The application 120 receives the hybrid bitstream 138 from the driver 124. Later, when the hybrid bitstream 138 is decoded following conventional decoding processes. Decoding of the hybrid bitstream 138 is possible without a decoder having any information about which encoder (e.g., the software encoder 126 or the hardware encoder 114) is used to encode any part of the hybrid bitstream 138.

It should be understood that many variations are possible based on the disclosure herein. Although features and elements are described above in particular combinations, each feature or element is usable alone without the other features and elements or in various combinations with or without other features and elements.

The various functional units illustrated in the figures and/or described herein (including, where appropriate, the driver 124, the software encoder 126, the encoding buffer 128, the directional parameter 130, the reconstructed pictures 132, the hardware bitstream 134, the software bitstream 136, and the hybrid bitstream 138) are implemented in any of a variety of different manners such as hardware circuitry, software or firmware executing on a programmable processor, or any combination of two or more of hardware, software, and firmware. The methods provided are implemented in any of a variety of devices, such as a general-purpose computer, a processor, or a processor core. Suitable processors include, by way of example, a general purpose processor, a special purpose processor, a conventional processor, a CPU, a DSP, a GPU, a parallel accelerated processor, a plurality of microprocessors, one or more microprocessors in association with a DSP core, a controller, a microcontroller, an Application Specific Integrated Circuits (ASIC), a FPGA circuit, any other type of integrated circuit (IC), and/or a state machine.

In one or more implementations, the methods and procedures provided herein are implemented in a computer program, software, or firmware incorporated in a non-transitory computer-readable storage medium for execution by a general-purpose computer or a processor. Examples of non-transitory computer-readable storage mediums include a ROM, a RAM, a register, cache memory, semiconductor memory devices, magnetic media such as internal hard disks and removable disks, magneto-optical media, and optical media such as a CD-ROM disk, or a digital versatile disk (DVD).

What is claimed is:

1. A system comprising:
- a processor configured to:
  - selectively enable a first encoder or a second encoder from a plurality of video encoders to output encoded frames of a video sequence based on a frame type a directional encoding preference for the video sequence wherein:
    - the first encoder encodes a first frame type and, when the video sequence has a bidirectional encoding preference, a third frame type; and
    - the second encoder encodes a second frame type and, when the video sequence has a unidirectional encoding preference, the third frame type; and
  - output a hybrid bitstream that interleaves a first encoded frame output from the first encoder with a second encoded frame output from the second encoder.

2. The system of claim 1, wherein the processor is configured to:
- enable the first encoder to output the first encoded frame when the first encoded frame comprises the first frame type; and
- enable the second encoder to output the second encoded frame when the second encoded frame comprises the second frame type.

3. The system of claim 2, wherein the first frame type is an intra-predicted frame type, and the second frame type is a bidirectional inter-predicted frame type.

4. The system of claim 2, wherein the processor is configured to:
- enable the first encoder to output a third encoded frame as one of the encoded frames when the third encoded frame comprises the third frame type and the directional encoding preference is bidirectional; and
- enable the second encoder to output the third encoded frame when the third encoded frame comprises the third frame type and the directional encoding preference is unidirectional.

5. The system of claim 4, wherein the third frame type is a unidirectional inter-predicted frame type.

6. The system of claim 2, wherein one of the first encoder and the second encoder comprises a software encoder and another one of the first encoder and the second encoder comprises a hardware encoder.

7. The system of claim 2, wherein the first encoder and the second encoder each comprise a hardware encoder.

8. The system of claim 2, wherein the first encoder and the second encoder each comprise a software encoder.

9. The system of claim 1, wherein the processor is configured:
- maintain separate bitstreams for first encoded frames output from the first encoder and second encoded frames output from the second encoder; and
- create the hybrid bitstream by interleaving the separate bitstreams.

10. The system of claim 1, wherein the processor is configured:
- generate reconstructed pictures from previous encoded frames output from the first encoder; and
- provide the reconstructed pictures to the second encoder as reference frames for outputting subsequent encoded frames of the video sequence.

11. A computing device comprising:

a first encoder and a second encoder; and a processor configured to:

selectively enable the first encoder or the second encoder to output a encoded frames of a video sequence based on a frame type and a directional encoding preference for the video sequence wherein:

the first encoder encodes a first frame type and, when the video sequence has a bidirectional encoding preference, a third frame type; and the second encoder encodes a second frame type and, when the video sequence has a unidirectional encoding preference, the third frame type; and output a hybrid bitstream that interleaves a first encoded frame output from the first encoder with a second encoded frame output from the second encoder.

12. The computing device of claim 11, further comprising:

a co-processor configured to execute the first encoder or the second encoder as a software encoder.

13. The computing device of claim 11, further comprising:

dedicated hardware configured to implement the first encoder or the second encoder as a hardware encoder.

14. The computing device of claim 11, wherein the processor is configured to execute a driver that outputs the hybrid bitstream to an application or operating system associated with the video sequence.

15. The computing device of claim 14, wherein the directional encoding preference is set by the application or operating system associated with the video sequence.

16. The computing device of claim 11, wherein the processor is configured to input a reconstructed picture associated with the first encoded frame into the second encoder as a reference frame used to output the second encoded frame.

17. The computing device of claim 11, wherein the processor is configured to:

enable the first encoder to output a third encoded frame of the video sequence when a frame type of the third encoded frame comprises a first frame type; and enable the second encoder to output the third encoded frame when the frame type of the third encoded frame comprises a second frame type.

18. The computing device of claim 17, wherein the processor is configured to:

enable the first encoder to output the third encoded frame when the frame type of the third encoded frame comprises a third frame type and the directional encoding preference is bidirectional; and enable the second encoder to output the third encoded frame when the frame type of the third encoded frame comprises the third frame type and the directional encoding preference is unidirectional.

19. The computing device of claim 18, wherein the processor is configured to input a reconstructed picture associated with the third encoded frame into the second encoder as a reference frame used to output the second encoded frame.

20. A method comprising:

receiving, by a processor, a video sequence;

determining a directional encoding preference for the video sequence;

selectively enabling one of a plurality of video encoders to encode each frame of the video sequence based on a frame type and the directional encoding preference for the video sequence by one of:

enabling a first encoder from the plurality of video encoders to encode a first type of frame of a video sequence;

enabling a second encoder from the plurality of video encoders to encode a second type of frame of the video sequence;

enabling the first encoder to encode a third type of frame of the video sequence when the directional encoding preference is a bidirectional encoding preference; and enabling the second encoder to encode the third type of frame when the directional encoding preference is a unidirectional encoding preference for the video sequence; and outputting a hybrid bitstream that interleaves a plurality of encoded frames output from the first encoder and the second encoder into an order.

* * * * *